United States Patent
Lee et al.

(10) Patent No.: US 12,333,709 B2
(45) Date of Patent: Jun. 17, 2025

(54) APPARATUS FOR INSPECTING DISPLAY PANEL AND METHOD FOR INSPECTING SURFACE OF DISPLAY PANEL

(71) Applicant: Samsung Display Co., LTD., Yongin-si (KR)

(72) Inventors: Ja Eun Lee, Yongin-si (KR); Jin Seo, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 146 days.

(21) Appl. No.: 18/119,369

(22) Filed: Mar. 9, 2023

(65) Prior Publication Data

US 2023/0410286 A1     Dec. 21, 2023

(30) Foreign Application Priority Data

Jun. 21, 2022    (KR) .................. 10-2022-0075820

(51) Int. Cl.
    *G06T 7/00*        (2017.01)
    *G01B 11/24*     (2006.01)
    *G06T 7/70*       (2017.01)
    *H04N 23/56*     (2023.01)

(52) U.S. Cl.
    CPC ............. *G06T 7/001* (2013.01); *G01B 11/24* (2013.01); *G06T 7/70* (2017.01); *H04N 23/56* (2023.01)

(58) Field of Classification Search
    CPC ......... G06T 7/001; G06T 7/70; G06T 7/0004; G01B 11/24; G01B 11/2408; G01B 11/306; H04N 23/56; G01N 2021/9513; G01N 21/95; G01N 21/956; G01N 21/8806; G01N 21/8851; G01N 2021/8858; G01N 2021/8861; G01N 2021/8883; G01N 2201/127
    See application file for complete search history.

(56) References Cited

U.S. PATENT DOCUMENTS

| | | | | |
|---|---|---|---|---|
| 2007/0211240 | A1* | 9/2007 | Matsumoto | G01N 21/9515 356/237.1 |
| 2014/0022376 | A1* | 1/2014 | Jung | G01N 21/8851 348/92 |
| 2016/0097726 | A1* | 4/2016 | Ahn | G01N 21/95 356/237.1 |

FOREIGN PATENT DOCUMENTS

KR    10-1146722    5/2012

\* cited by examiner

*Primary Examiner* — Alazar Tilahun
(74) *Attorney, Agent, or Firm* — KILE PARK REED & HOUTTEMAN PLLC

(57) ABSTRACT

An apparatus for inspecting a display panel includes a light source irradiating light toward a surface of the display panel; a light detector detecting light reflected from a region of interest on the surface of the display panel to generate a captured image; a lens system including at least one lens receiving the reflected light and providing reflected light to the light detector; and an analyzer quantifying a degree of curvature of the region of interest based on a result of comparing modeling data including distribution of reference light intensity for the region of interest with detection data corresponding to the captured image, and determining whether the display panel is defective based on a quantified result.

20 Claims, 16 Drawing Sheets

APPARATUS FOR INSPECTING DISPLAY PANEL AND METHOD FOR INSPECTING SURFACE OF DISPLAY PANEL

CROSS-REFERENCE TO RELATED APPLICATION(S)

The application claims priority to and benefits of Korean Patent Application No. 10-2022-0075820 under 35 U.S.C. § 119, filed Jun. 21, 2022 in the Korean Intellectual Property Office (KIPO), the entire contents of which are incorporated herein by reference.

BACKGROUND

1. Technical Field

The disclosure relates to an apparatus for inspecting a display panel and a method for inspecting a surface of the display panel.

2. Description of the Related Art

As a display panel becomes thinner, a surface of the display panel may be distorted during a manufacturing process, or may have more severe curvature or unevenness than product specifications. The uneven surface of the display panel as described above may cause product defects.

Therefore, in mass-producing the display panel, a procedure for quickly and accurately inspecting the curvature, distortion, and the like of the surface of the display panel is required.

SUMMARY

An object of the disclosure is to provide an apparatus for inspecting a display panel that determines whether a surface of the display panel is defective by comparing detection data including intensity distribution of light reflected from a region of interest on the surface of the display panel with modeling data, and a method for inspecting the surface of the display panel.

However, objects of the disclosure are not limited to the above-described objects, and may be variously extended without departing from the spirit and scope of the disclosure.

In order to achieve the object of the disclosure, an apparatus for inspecting a display panel according to embodiments of the disclosure may include a light source irradiating light toward a surface of the display panel; a light detector detecting light reflected from a region of interest on the surface of the display panel to generate a captured image; a lens system including at least one lens receiving reflected light and providing the reflected light to the light detector; and an analyzer quantifying a degree of curvature of the region of interest based on a result of comparing modeling data including distribution of reference light intensity for the region of interest with detection data corresponding to the captured image, and determining whether the display panel is defective based on a quantified result.

According to an embodiment, the apparatus may further include an optical system adjusting the light emitted from the light source into parallel light, providing the parallel light to the region of interest, and adjusting a diameter of the parallel light according to a size of the region of interest.

According to an embodiment, the analyzer may include a storage storing the modeling data according to the region of interest; a first calculator calculating differences in magnitudes of data values for each coordinate between the modeling data and the detection data; a second calculator calculating a total sum of the differences in magnitudes as a representative value corresponding to the degree of curvature; and a determiner comparing the representative value with a threshold value to determine whether the display panel is defective.

According to an embodiment, the determiner may determine that the display panel is defective in case that the representative value exceeds the threshold value, and the determiner may determine that the display panel is normal in case that the representative value is equal to or less than the threshold value.

According to an embodiment, the analyzer may further include a reference position extractor extracting, as reference coordinates, coordinates of a position corresponding to a maximum value of light intensity included in the detection data; and a modeling data corrector generating corrected modeling data by shifting the modeling data so that coordinates of a position corresponding to a maximum value of the reference light intensity included in the modeling data coincide with the reference coordinates.

According to an embodiment, the first calculator may calculate differences in magnitudes of data values for each coordinate between the corrected modeling data and the detection data.

According to an embodiment, the first calculator may normalize data values of the corrected modeling data based on a maximum value included in the corrected modeling data.

According to an embodiment, the first calculator may normalize data values of the detection data based on a maximum value included in the detection data.

According to an embodiment, the first calculator may calculate differences in magnitudes of normalized values for each coordinate of the detection data and the corrected modeling data.

According to an embodiment, the detection data of the display panel determined to be normal may be stored in the storage as the modeling data.

According to an embodiment, the light detector may include a CCD image sensor.

According to an embodiment, the light detector may include a CMOS image sensor.

In order to achieve the object of the disclosure, a method for inspecting a surface of a display panel according to embodiments of the disclosure may include generating detection data including distribution of light intensity from reflected light of incident light irradiated to a region of interest on a surface of the display panel; determining a degree of curvature of the region of interest based on differences in magnitudes of data values for each coordinate between the detection data and modeling data for the region of interest; and determining whether the display panel is defective based on the degree of curvature.

According to an embodiment, the modeling data may include distribution of reference light intensity for the region of interest.

According to an embodiment, the determining of the degree of curvature may include extracting, as reference coordinates, coordinates of a position corresponding to a maximum value of the light intensity included in the detection data; and generating corrected modeling data by shifting the modeling data so that coordinates of a position corresponding to a maximum value of the reference light intensity of the modeling data coincide with the reference coordinates.

According to an embodiment the determining of the degree of curvature may further include calculating differences of data values for each coordinate between the corrected modeling data and the detection data.

According to an embodiment the determining of the degree of curvature may further include calculating a total sum of the differences as a representative value corresponding to the degree of curvature.

According to an embodiment, the determining whether the display panel is defective may include comparing the representative value with a threshold value; determining that the display panel is defective in case that the representative value exceeds the threshold value; and determining that the display panel is normal in case that the representative value is equal to or less than the threshold value.

According to an embodiment, the incident light may be adjusted to correspond to a size of the region of interest.

According to an embodiment, each of the differences of data values may be an absolute value of a difference between data values of corresponding coordinates between the detection data and the corrected modeling data.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE EMBODIMENTS

Figure 1:
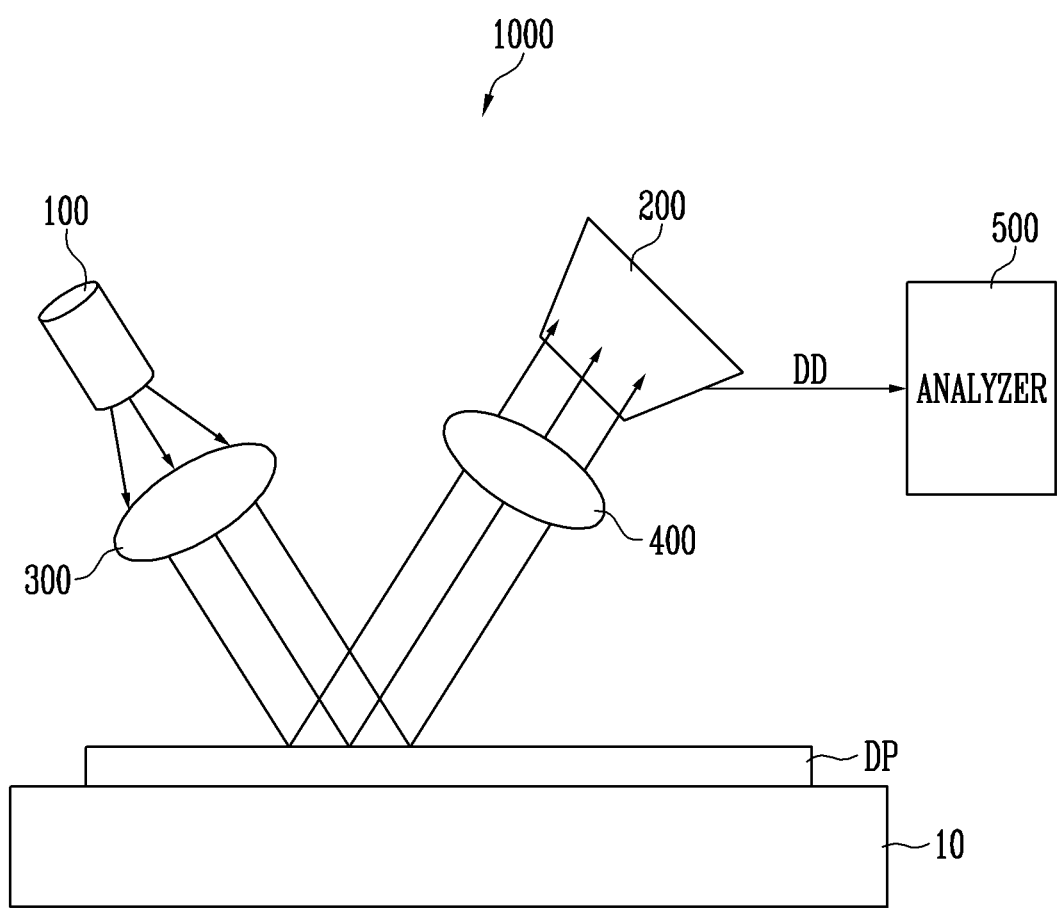
FIG. 1 is a schematic diagram illustrating an apparatus for inspecting a display panel according to embodiments of the disclosure.

Hereinafter, embodiments of the disclosure will be described in more detail with reference to the accompanying drawings. The same reference numerals are used for the same elements in the drawings, and duplicate descriptions for the same elements are omitted.

The embodiments described in the specification are intended to clearly explain the spirit of the disclosure to those of ordinary skill in the art to which the disclosure pertains. Therefore, the disclosure is not limited by the embodiments described in the specification, and the scope of the disclosure should be construed to include modifications or variations without departing from the spirit of the disclosure.

The accompanying drawings in the specification are for explaining the disclosure. Since the shapes shown in the drawings may be exaggerated as necessary to help the understanding of the disclosure, the disclosure is not limited by the drawings.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

For the purposes of this disclosure, the phrase "at least one of A and B" or "at least one A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

Although the terms "first," "second," and the like may be used herein to describe various types of elements, these elements should not be limited by these terms. These terms are used to distinguish one element from another element. Thus, a first element discussed below could be termed a second element without departing from the teachings of the disclosure.

In the present specification, when it is determined that a detailed description of a known configuration or function related to the present invention may obscure the gist of the present invention, a detailed description thereof will be omitted if necessary.

FIG. 1 is a schematic diagram illustrating an apparatus for inspecting a display panel according to embodiments of the disclosure.

Referring to FIG. 1, an apparatus 1000 for inspecting a display panel may include a light source 100, a light detector 200, an optical system 300, a lens system 400, and an analyzer 500. Also, the apparatus 1000 for inspecting the display panel may further include a stage 10 on which the display panel DP is disposed (mounted).

The apparatus 1000 for inspecting the display panel may detect a defect of the display panel DP (for example, a surface of the display panel DP) by analyzing whether the degree of curvature of a region of interest on the surface of the display panel DP deviates from a criterion (e.g., a predetermined or selectable criterion). For example, the apparatus 1000 for inspecting the display panel according to embodiments of the disclosure may not detect the specific shape of a surface curvature or unevenness, and may be characterized in that it quickly determines whether the approximate degree of curvature in the region of interest is at an acceptable level by detecting distribution of light reflected from the surface.

The light source 100 may radiate light toward the surface of the display panel DP. In an embodiment, the light source 100 may include various types of lamps or lights emitting visible light. However, this is merely an example, and the light source 100 may include a laser light source.

An angle at which the light source 100 is disposed, a distance between the light source 100 and the display panel DP, or the like may be adjusted according to the position, shape, size, or the like of the region of interest of the display panel DP.

The light detector 200 may detect light reflected from the region of interest on the surface of the display panel DP to generate a captured image. The captured image may include detection data DD. The detection data DD may include information on distribution of reflected light intensity. The detection data DD may be provided to the analyzer 500.

In an embodiment, the light detector 200 may include a Charge Coupled Device (CCD) image sensor. The CCD image sensor may include photodiodes, and may generate an image (captured image) based on an amount of electrons generated according to an amount of light (light intensity) incident on the photodiodes.

In an embodiment, the light detector 200 may include a CMOS image sensor. The CMOS image sensor may have an advantageous effect in terms of power consumption compared to the CCD image sensor. However, this is merely an example, and the light detector 200 is not limited thereto. For example, the light detector 200 may include various types of optical sensors capable of detecting intensity and distribution of reflected light.

The optical system 300 may be disposed between the light source 100 and the display panel DP. The optical system 300 may adjust the light emitted from the light source 100 into parallel light and provide the parallel light to the region of interest of the display panel DP. The optical system 300 may adjust the diameter, shape, etc. of the parallel light according to the size, position, planar shape, etc. of the region of interest. Accordingly, a signal-to-noise ratio (SNR) and light detection reliability may be improved by minimizing light reflection in a portion other than the region of interest.

According to an embodiment, the optical system 300 may include various combinations of lens arrays. The lens array may include a concave lens and/or a convex lens. The optical system 300 may control the light provided from the light source 100 by adjusting the arrangement angle, distance, or the like of lenses included in the lens array.

The lens system 400 may receive light reflected from the display panel DP and provide reflected light to the light detector 200. The lens system 400 may include at least one lens. For example, the lens system 400 may include various combinations of lens arrays for guiding the reflected light to the light detector 200. The lens array may include a concave lens and/or a convex lens.

The analyzer 500 may compare modeling data with the detection data DD corresponding to a captured image of the optical system 300, and quantify a degree of curvature of the region of interest based on a comparison result. The modeling data may include distribution of reference light intensity, which may be a criterion of light distribution for the region of interest.

For example, the modeling data may be data obtained by prior experimentation, measurement, or the like, and may be stored in the analyzer 500 according to the type of the region of interest. As another example, data based on the detection data DD in case that it is determined that the display panel DP is normal may be stored as the modeling data.

In embodiments of the disclosure, the degree of curvature of the region of interest should be understood as a relative number to a criterion included in the modeling data, not an absolute curvature (average of the amount of curvature) or flatness of a corresponding region.

Figure 8:
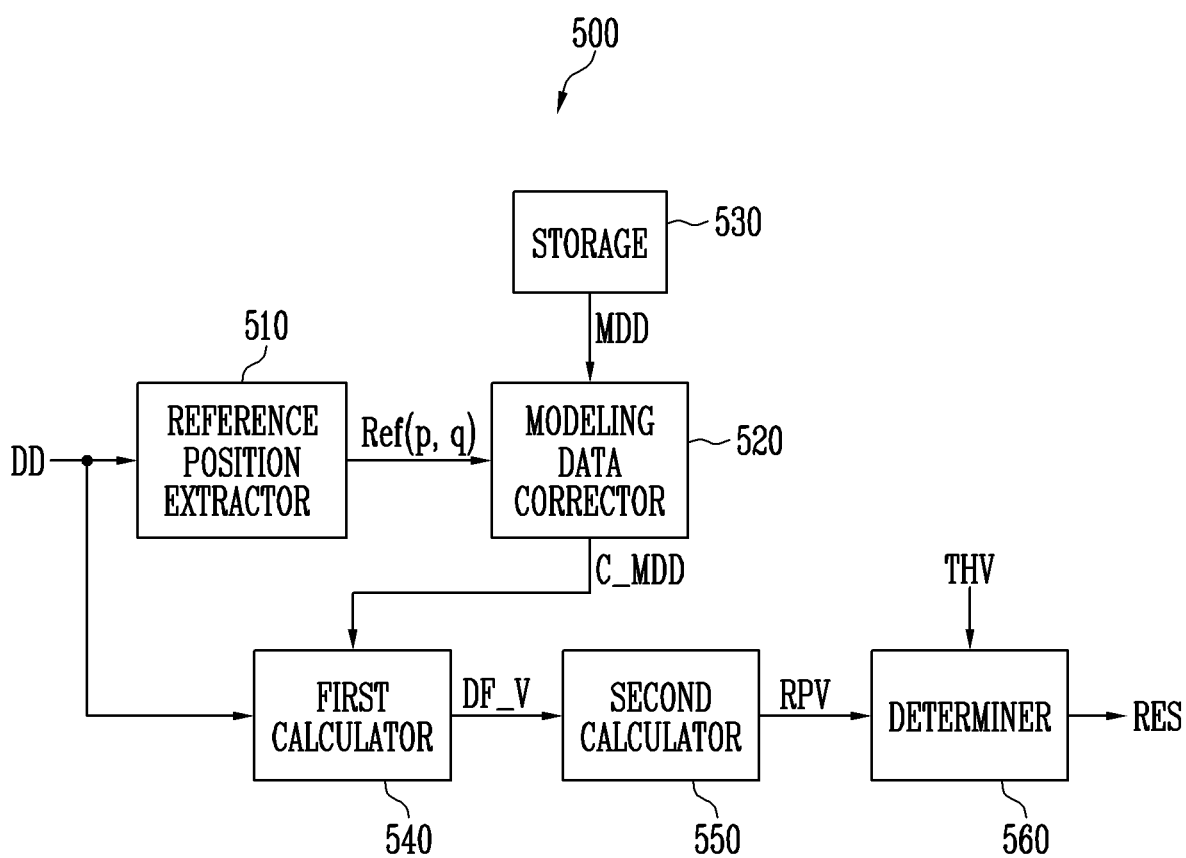
FIG. 8 is a schematic block diagram illustrating an example of an analyzer included in the apparatus for inspecting the display panel of FIG. 1.

The analyzer 500 may determine whether the display panel DP is defective based on a quantified degree of curvature (for example, shown as a representative value RPV in FIG. 8). For example, the analyzer 500 may compare the representative value, which may be the quantified degree of curvature, with a threshold value (or a predetermined or selectable threshold value).

In case that the representative value is greater than the threshold value, the region of interest may be considered to include curvature or dent that deviates from the criterion, and the analyzer 500 may determine that the corresponding display panel DP is defective.

In case that the representative value is less than or substantially equal to the threshold value, the analyzer 500 may determine that the corresponding display panel DP is normal (good product).

Figure 2A:
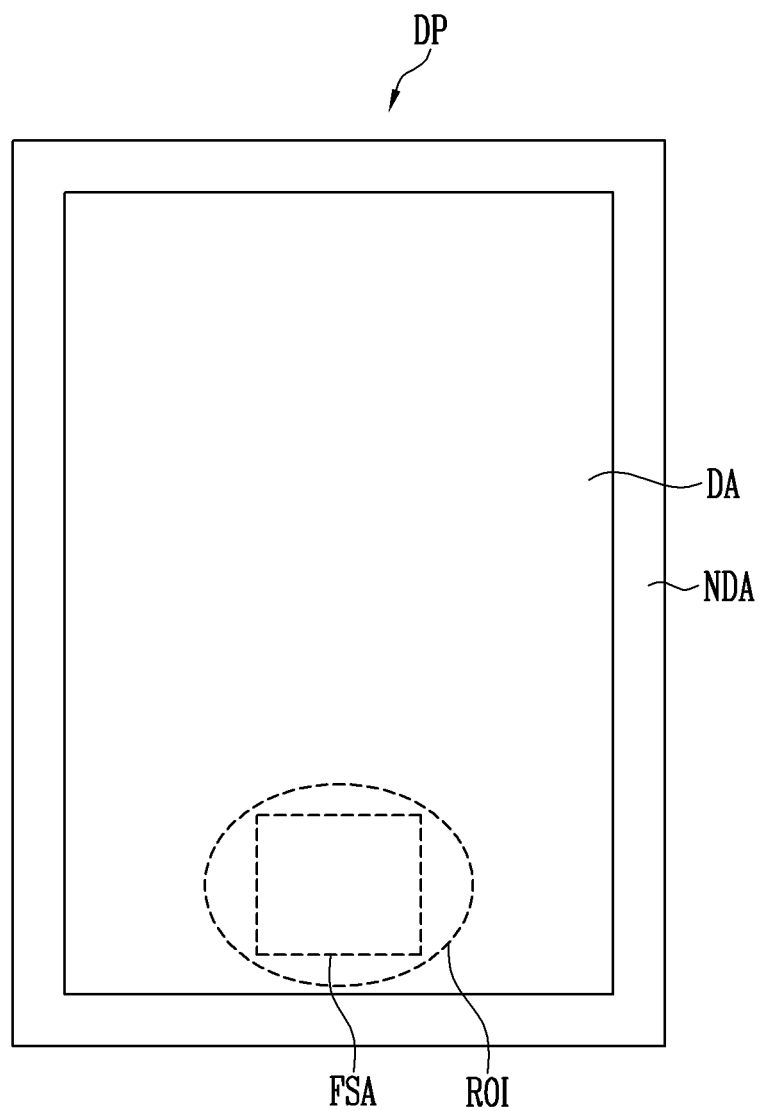
FIGS. 2A and 2B are schematic diagrams illustrating an example of a display panel applied to the apparatus for inspecting the display panel of FIG. 1.
Figure 2B:
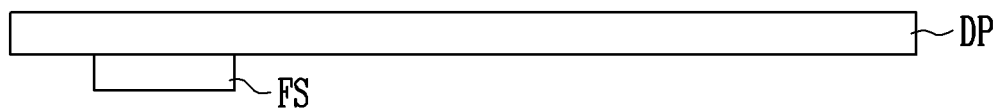

FIGS. 2A and 2B are schematic diagrams illustrating an example of a display panel applied to the apparatus for inspecting the display panel of FIG. 1.

Referring to FIGS. 1, 2A, and 2B, all or at least a part of the display panel DP may have flexibility. The display panel DP may include self-light emitting display elements. For example, the display panel DP may include organic light emitting elements, inorganic light emitting elements, or light emitting elements formed of a combination of an inorganic material and an organic material.

The display panel DP may include a display area DA and a non-display area NDA.

The display area DA may be an area in which pixels are provided. The pixel may include at least one light emitting element.

The non-display area NDA may be positioned around the display area DA, and various signal pads, wirings, driving circuits, or the like may be disposed.

In an embodiment, the display area DA may include a fingerprint sensing area FSA. The fingerprint sensing area FSA may be implemented by a fingerprint sensor FS. For example, the fingerprint sensor FS may include one of a capacitive fingerprint recognition sensor, an optical fingerprint recognition sensor, and an ultrasonic fingerprint recognition sensor.

In an embodiment, as shown in FIG. 2B, the fingerprint sensor FS may be attached (or disposed) to a rear surface of the display panel DP. Since the display panel DP is thin and flexible, a portion where the fingerprint sensor FS and the display panel DP are bonded may be distorted. Accordingly, a region of a display surface including the portion where the fingerprint sensor FS and the display panel DP are bonded may be set as a region of interest ROI.

A conventional surface defect inspection using a captured image may be performed on the region of interest ROI in a Phase Stepped Deflectometry (PSD) method. In the PSD method, incident light may be irradiated while changing the period and direction of a sine wave, and the phase of a measured image is shifted to calculate the slope and curvature of a surface. Therefore, the PSD method may not be suitable for mass-production inspection because it takes a long time for inspection and includes unnecessary quantified measurement information.

The apparatus 1000 for inspecting the display panel according to embodiments of the disclosure may include a configuration and operation for quickly determining whether an approximate degree of curvature in the region of interest is at an acceptable level by detecting the distribution of light reflected in the region of interest ROI. Accordingly, the distortion (degree of curvature) of the display surface (the region of interest ROI) of the display panel DP corresponding to the fingerprint sensing area FSA may be quickly determined.

Although the region of interest ROI is shown in a circular shape in FIG. 2A, the shape of the region of interest ROI is not limited thereto. For example, the region of interest ROI may be deformed or set in various shapes, such as an oval or a rectangle, depending on the purpose of the inspection.

Figure 3A:
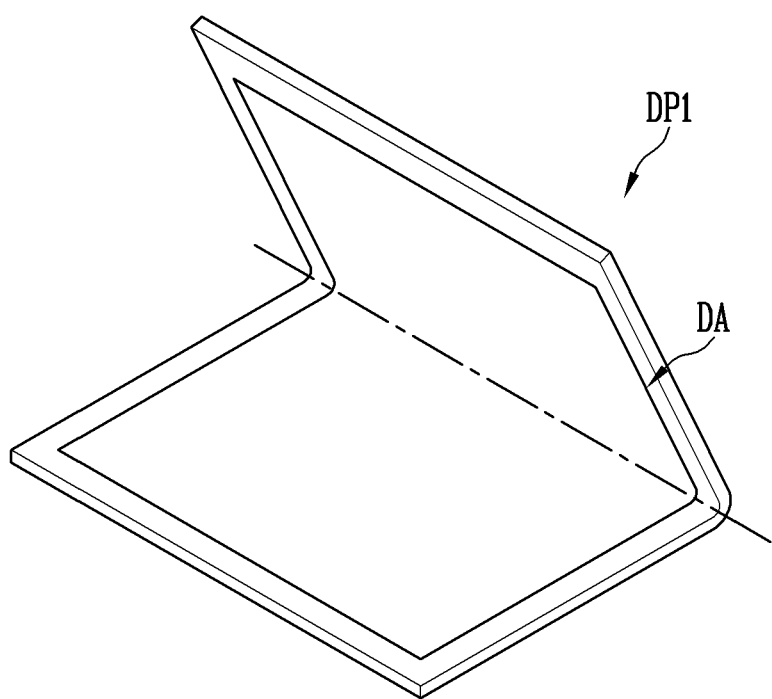
FIGS. 3A and 3B are schematic diagrams illustrating another example of a display panel applied to the apparatus for inspecting the display panel of FIG. 1.
Figure 3B:
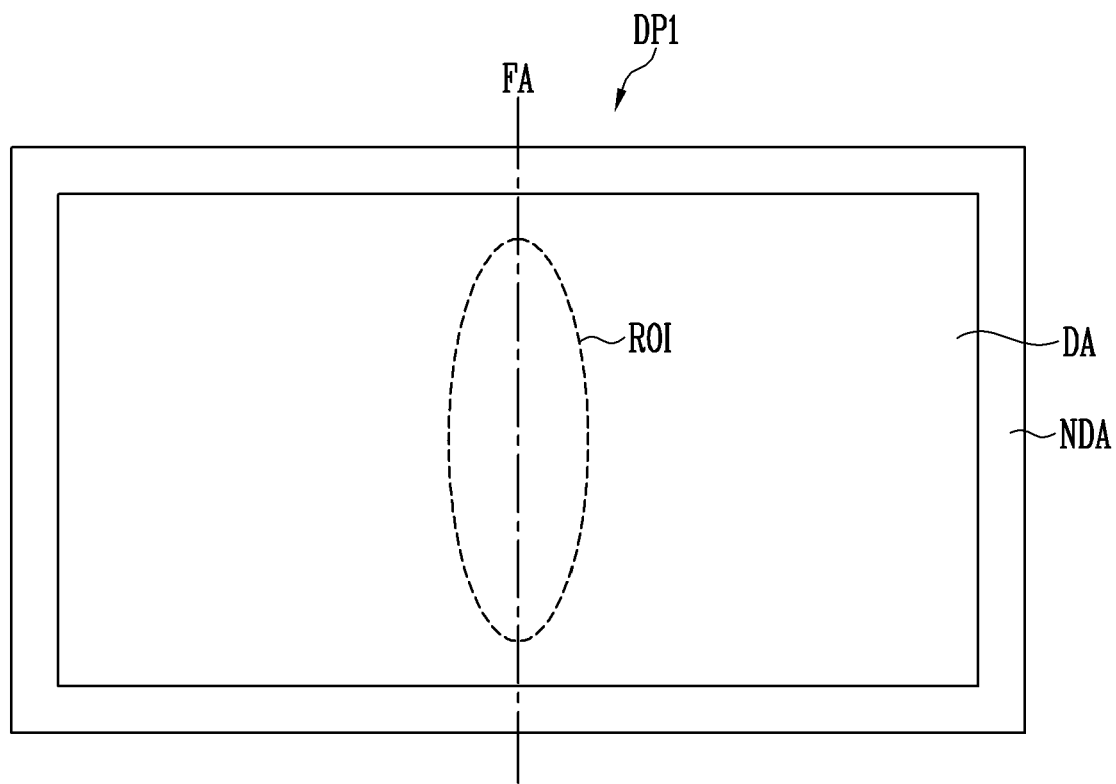

FIGS. 3A and 3B are schematic diagrams illustrating another example of a display panel applied to the apparatus for inspecting the display panel of FIG. 1.

Referring to FIGS. 1, 3A, and 3B, the apparatus 1000 for inspecting the display panel may determine whether a foldable display panel DP1 is defective by detecting a curvature of an area corresponding to a folding axis FA of the foldable display panel DP1.

In an embodiment, the foldable display panel DP1 may be an in-foldable display panel that can be folded (in-folded) such that the display area DA faces inward with respect to the folding axis FA. However, this is merely an example, and the foldable display panel DP1 may be implemented so that both in-folding and out-folding are possible.

Due to characteristics of the foldable display panel DP1 that is folded by a hinge, even in case that the foldable display panel DP1 is fully unfolded, a curvature may occur in a folding area including the folding axis FA. However, in case that the curvature deviates from a threshold criterion (e.g., a predetermined or selectable threshold criterion), visibility (quality) of an image in the folding area may be deteriorated.

Accordingly, a region (e.g., a predetermined or selectable region) of interest ROI including the folding axis FA may be set, and surface curvature inspection and quality determination may be performed on the region of interest ROI. In this way, the apparatus 1000 for inspecting the display panel may perform not only an inspection on a flat plane but also a quality determination on the display area having a curvature (e.g., a predetermined or selectable curvature).

However, this is merely an example, and the apparatus 1000 for inspecting the display panel may be applied to detect various types of curvature of the surface of the display panel.

Figure 4:
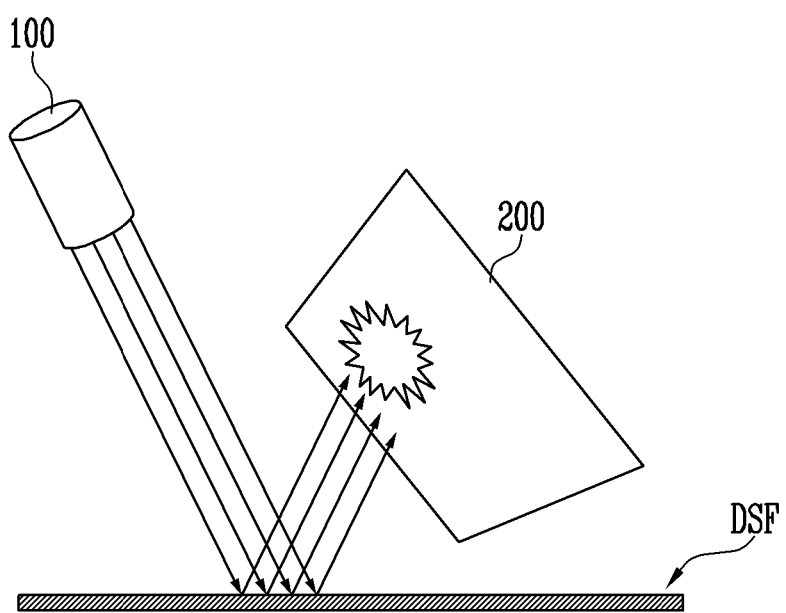
FIGS. 4 and 5 are schematic diagrams for explaining an example of modeling data used in the apparatus for inspecting the display panel of FIG. 1.
Figure 5:
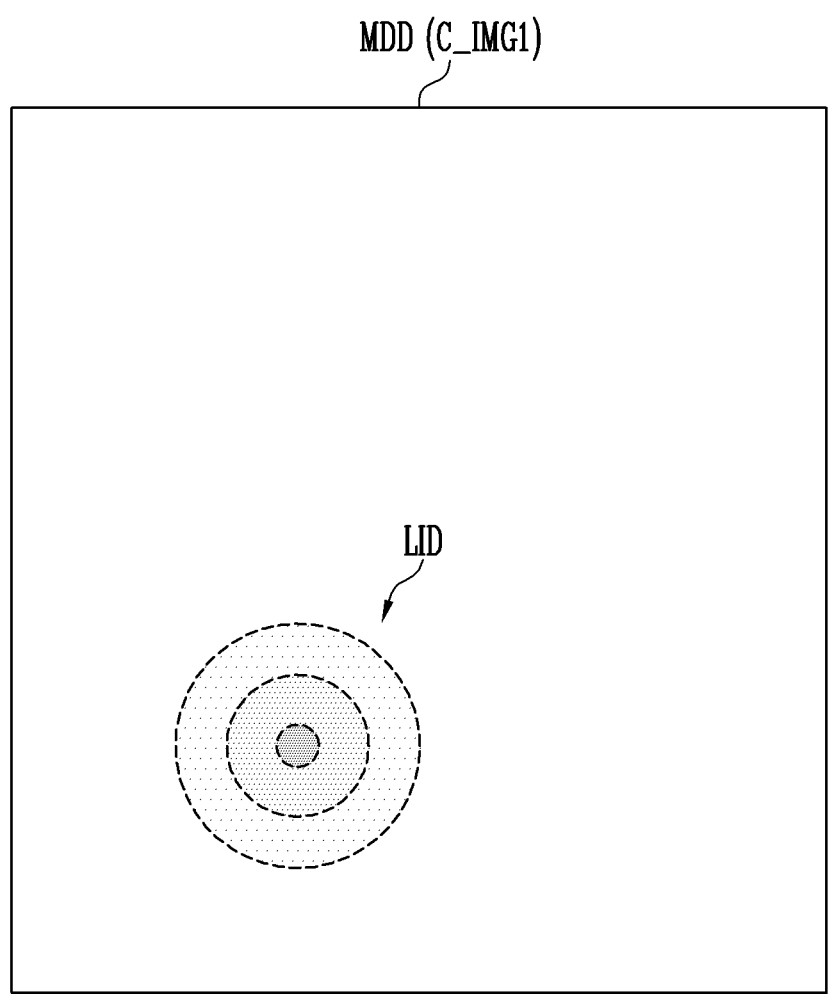

FIGS. 4 and 5 are schematic diagrams for explaining an example of modeling data used in the apparatus for inspecting the display panel of FIG. 1.

For convenience of description, FIG. 4 shows a part of the configuration of the apparatus 1000 for inspecting the display panel of FIG. 1.

Referring to FIGS. 1, 4, and 5, the light detector 200 may generate a first captured image C_IMG1 based on light reflected from the surface (for example, a display surface DSF) of the display panel DP.

FIGS. 4 and 5 show an example of light distribution (light profile) of an image obtained in case that the display surface DSF is flat. In case that the display surface DSF is flat, a reflection angle of light may be constant, and light distribution may be concentrated in an area (e.g., a predetermined or selectable area). As shown in FIG. 5, the first captured image C_IMG1 may have light distribution data corresponding to the region of interest ROI. For example, a circular light distribution image corresponding to a cross-section of the light incident from the light source 100 may be obtained. The light distribution image may include different light intensity distribution LID for areas (e.g., each predetermined area).

In an embodiment, the light distribution data (for example, reference light intensity distribution) included in the first captured image C_IMG1 may be used as modeling data MDD.

The modeling data MDD may represent an ideal distribution of light reflected on the display surface DSF. For example, the modeling data MDD may be set based on a method of measuring reflected light excluding front reflected light (Specular Component Excluded; SCE) or a method of measuring reflected light including front reflected light (Specular Component Included; SCI).

In an embodiment, the modeling data MDD may be data normalized based on a maximum value within the light intensity distribution LID. Accordingly, an operation speed between the modeling data MDD and the normalized detection data DD may be faster.

Figure 6:
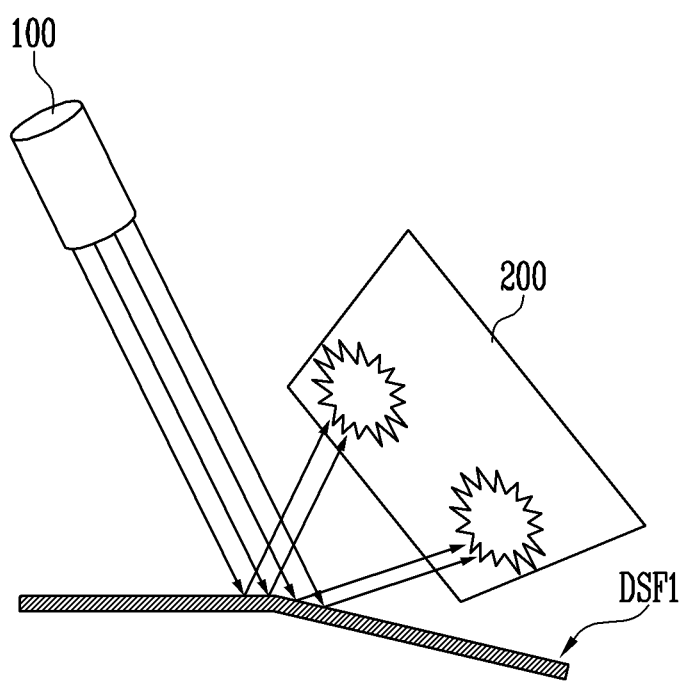
FIGS. 6 and 7 are schematic diagrams for explaining an example of detection data generated by the apparatus for inspecting the display panel of FIG. 1.
Figure 7:
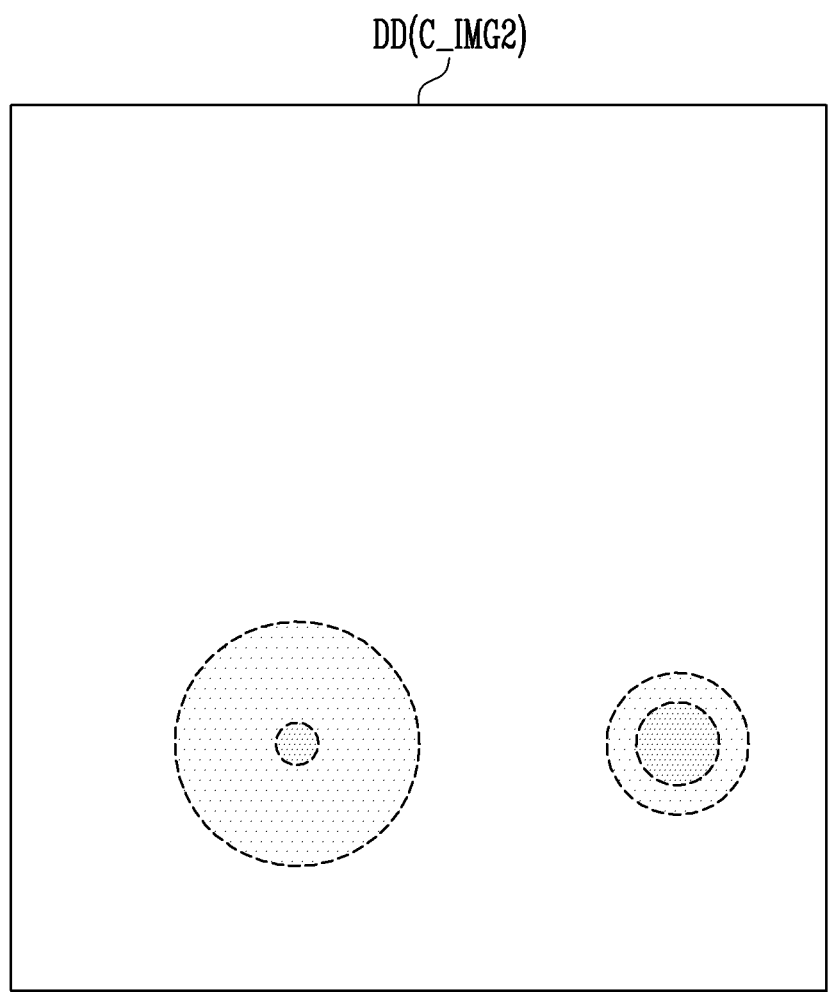

FIGS. 6 and 7 are schematic diagrams for explaining an example of detection data generated by the apparatus for inspecting the display panel of FIG. 1.

For convenience of description, FIG. 6 shows a part of the configuration of the apparatus 1000 for inspecting the display panel of FIG. 1.

Referring to FIGS. 1, 6, and 7, the light detector 200 may generate a second captured image C_IMG2 based on light reflected from the surface (for example, a display surface DSF1) of the display panel DP.

The display surface DSF1 shown in FIG. 6 may include a curvature (bent portion). Accordingly, the reflection angle of light may be changed based on the curvature, a symmetry of the light profile may be broken, and the light may be distributed over a wide reflection angle.

For example, as shown in FIG. 7, in the detection data DD obtained by the second captured image C_IMG2, the light profile (light distribution) may be formed in regions. For example, due to the curvature of the display surface DSF1, light distributions of the first captured image C_IMG1 shown in FIG. 5 and the second captured image C_IMG2 with respect to a same incident light may be different from each other. Whether the display panel DP is defective may be inspected by quickly calculating the difference in the light distributions as a deviation in light intensity for each coordinate of the first captured image C_IMG1 and the second captured image C_IMG2.

Figure 9A:
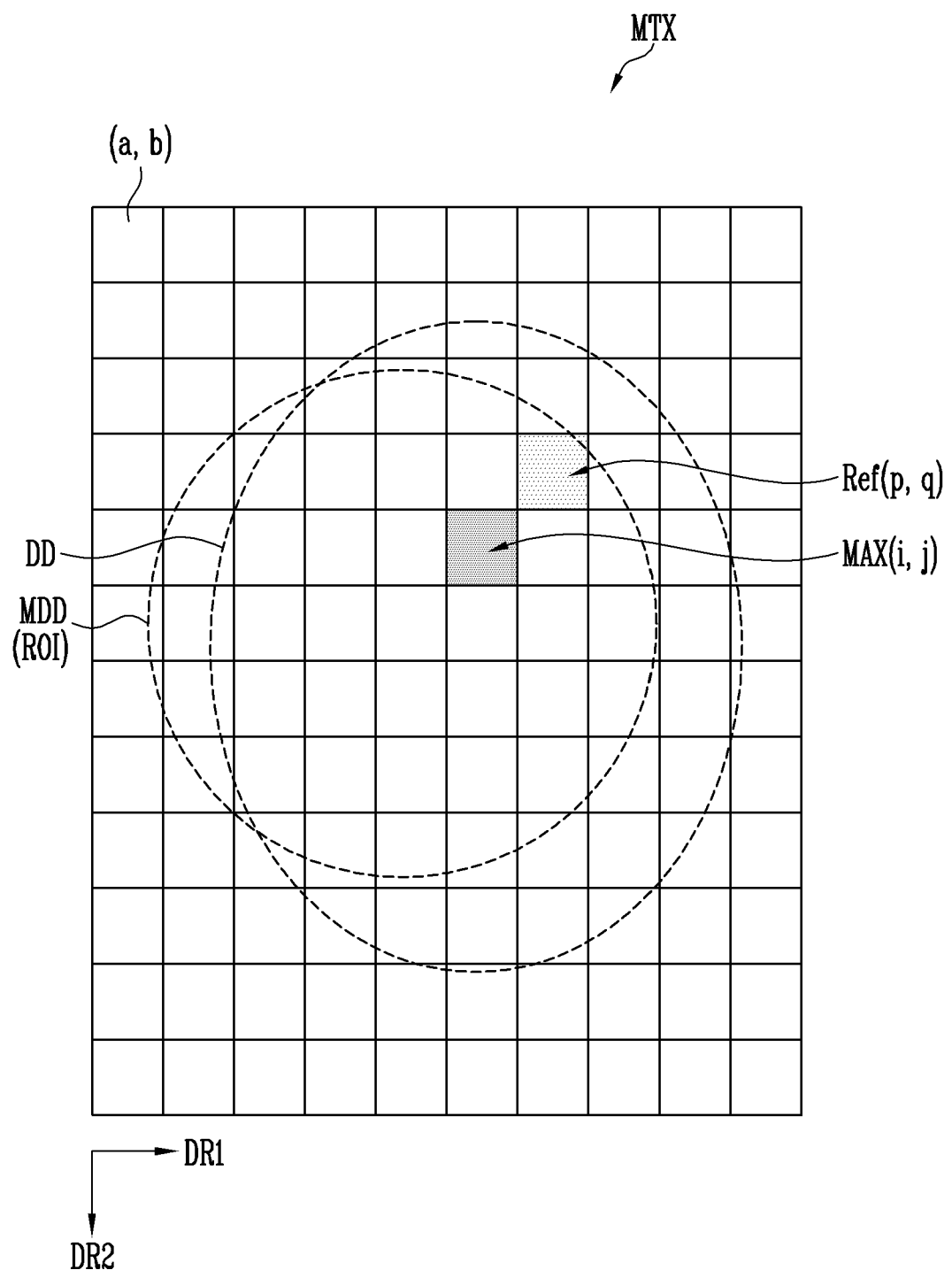
FIGS. 9A to 9C are schematic diagrams for explaining an example in which the analyzer of FIG. 8 generates corrected modeling data.
Figure 9B:
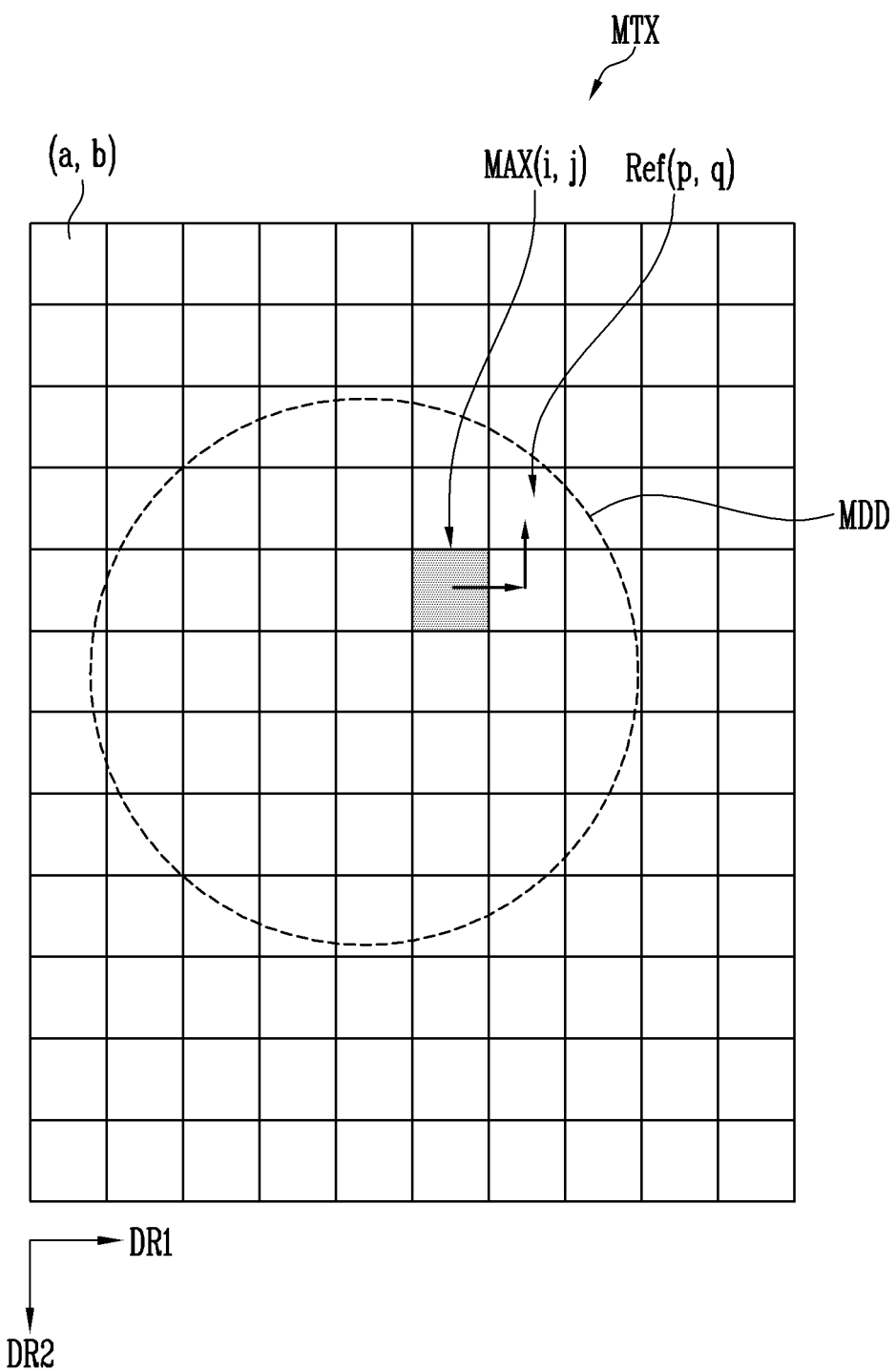
Figure 9C:
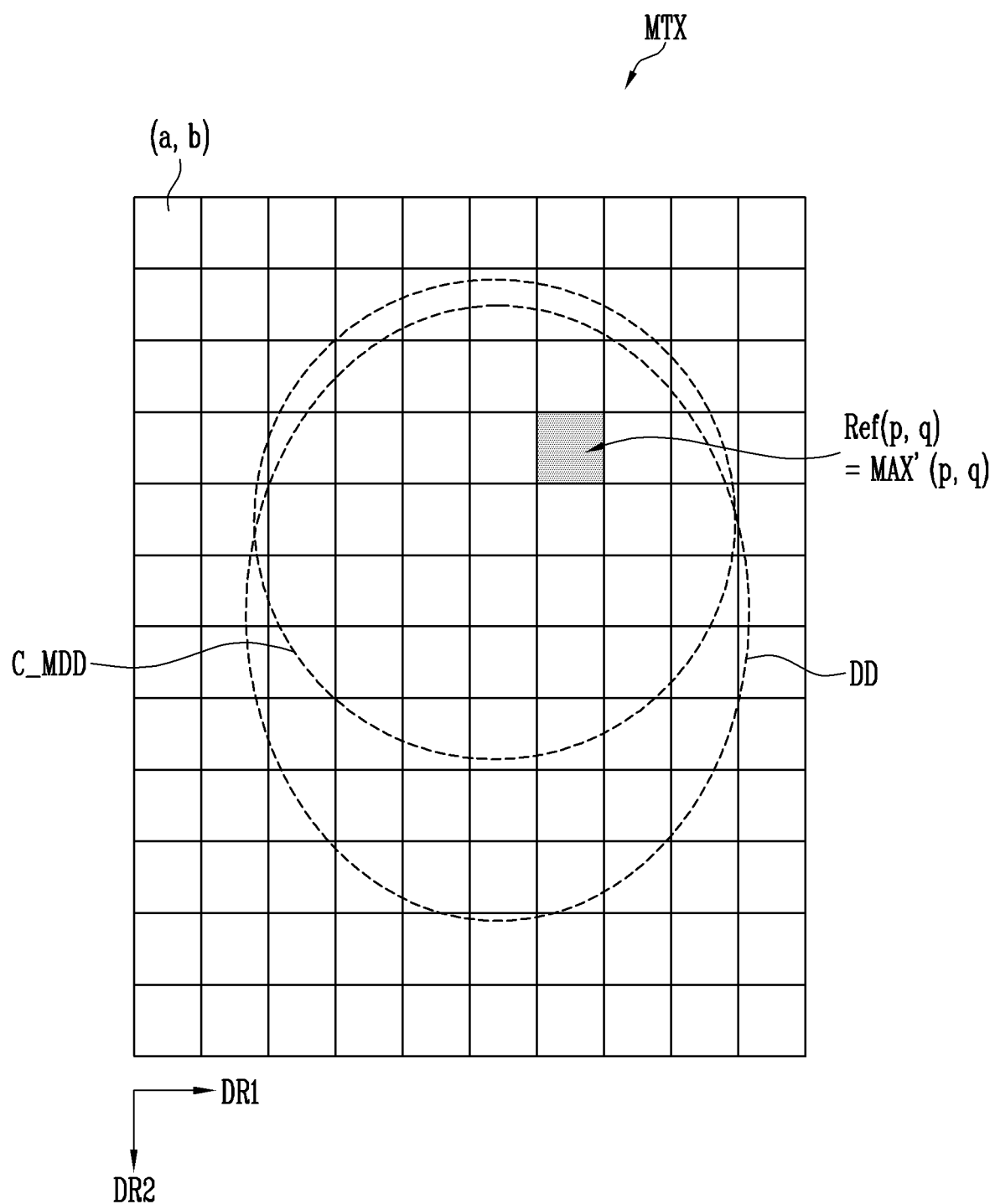

FIG. 8 is a schematic block diagram illustrating an example of an analyzer included in the apparatus for inspecting the display panel of FIG. 1. FIGS. 9A to 9C are schematic diagrams for explaining an example in which the analyzer of FIG. 8 generates corrected modeling data.

Referring to FIGS. 1, 8, 9A, 9B, and 9C, the analyzer 500 may include a storage 530, a first calculator 540, a second calculator 550, and a determiner 560. The analyzer 500 may further include a reference position extractor 510 for correcting an error in a state in which the display panel DP is mounted (or aligned) and a modeling data corrector 520.

The modeling data MDD according to the region of interest ROI may be stored in the storage 530. In an embodiment, the storage 530 may be a non-volatile memory. For example, the storage 530 may be implemented as an Erasable Programmable Read-Only Memory (EPROM), an Electrically Erasable Programmable Read-Only Memory (EEPROM), a flash memory, or the like.

The modeling data MDD may be data obtained in advance by experimentation, measurement, or the like, and may be stored in the storage 530 corresponding to the region of interest ROI. As another example, in case that it is determined that the display panel DP is normal, the detection data DD or processed data thereof may be stored as the modeling data MDD.

The modeling data MDD may include the distribution of reference light intensity for the region of interest ROI. According to an embodiment, the region of interest ROI of the modeling data MDD may be divided into coordinates constituting a matrix (e.g., a predetermined or selectable matrix) MTX. For example, as shown in FIGS. 9A to 9C, each grid included in the matrix MTX may correspond to coordinates. For example, the coordinates of any grid may be shown as (a, b), where a and b may be positive integers. The coordinates may be configured in a first direction DR1 and a second direction DR2. The distribution of light intensity (light profile) is not specifically shown in FIGS. 9A to 9C, and a light distribution region included in the modeling data MDD and the detection data DD is schematically shown in FIGS. 9A to 9C. For example, a boundary of the modeling data MDD may indicate a boundary of an ideal region in which the reflected light for the region of interest ROI is detected, and the reference light intensity may be distributed within the boundary of the modeling data MDD. The light intensity and data value outside the boundary of the modeling data MDD may be understood as zero (0).

The storage 530 may provide the modeling data MDD to the modeling data corrector 520. However, this is merely an example, and the modeling data corrector 520 may be omitted, and the storage 530 may provide (e.g. directly provide) the modeling data MDD to the first calculator 540.

The reference position extractor 510 may receive the detection data DD. The reference position extractor 510 may extract coordinates of a position corresponding to a maximum value of the light intensity included in the detection data DD as reference coordinates Ref(p, q), where p and q may be positive integers.

The shape and position of the light intensity distribution (light profile) by the detection data DD may be different from the modeling data MDD due to dents, undulations, or the like of the display surface. The detection data DD may include light intensity information for each coordinate divided in a grid format. As described above, a description of the light intensity for each coordinate of the detection data DD is omitted for convenience. In the detection data DD, the light intensity and data value outside the boundary of the detection data DD may be understood as zero (0).

The reference position extractor 510 may include a digital operation circuit for extracting a maximum value among data values for each coordinate of the detection data DD. The digital operation circuit may be implemented in various types of software and/or hardware. Also, the reference coordinates Ref(p, q) may be provided to the modeling data corrector 520 as a digital value.

The modeling data corrector 520 may extract coordinates (hereinafter referred to as maximum value coordinates MAX (i, j), where i and j may be positive integers) of a position corresponding to a maximum value of the reference light intensity included in the modeling data MDD. The modeling data corrector 520 may shift the modeling data MDD so that the maximum value coordinates MAX(i j) coincide with the reference coordinates Ref(p, q). For example, as shown in FIGS. 9B and 9C, the maximum value coordinates MAX(i j) may be shifted to the reference coordinates Ref(p, q), and shifted direction and shifted amount of the maximum value coordinates MAX(i j) may be applied to the entire modeling data MDD. Data from which the modeling data MDD is shifted may be understood as corrected modeling data C_MDD.

Accordingly, as shown in FIG. 9C, the shifted maximum value coordinates MAX'(p, q) and the reference coordinates Ref(p, q) may coincide with each other, and the relationship between the detection data DD and the corrected modeling data C_MDD may be different or changed.

The modeling data corrector 520 may include an operation circuit for shifting digital data according to a criterion. The operation circuit may be implemented in various types of known software and/or hardware.

The corrected modeling data C_MDD may be generated to correct an alignment error when the display panel DP is mounted on the stage 10. For example, when the display panel DP is mounted on the stage 10 for inspection, the display panel DP may be inclined, rotated, or displaced with respect to the reference position due to an external factor or the like. The reference position extractor 510 and the modeling data corrector 520 may correct the alignment error and improve the reliability of the curvature detection result by matching the position (the reference coordinates Ref(p, q)) of the maximum value of the detection data DD and the position (the maximum value coordinates MAX(i, j)) of the maximum value of the modeling data MDD.

The first calculator 540 may calculate differences in magnitudes DF_V of data values for each coordinate between the modeling data MDD and the detection data DD. In an embodiment, the first calculator 540 may calculate differences in magnitudes DF_V of data values for each coordinate between the corrected modeling data C_MDD and the detection data DD. For example, a difference between data values in each coordinate of the matrix MTX shown in FIG. 9C may be calculated.

In an embodiment, each of the differences in magnitude DF_V of the data values may be an absolute value of a difference between data values of corresponding coordinates of the detection data DD and the corrected modeling data C_MDD. A difference between values in coordinates outside the boundary of the corrected modeling data C_MDD and outside the boundary of the detection data DD may be zero (0).

In case that one of the detection data DD and the corrected modeling data C_MDD has an actual data value at coordinates, a difference between data values corresponding to the corresponding coordinates may correspond to the actual data value.

The first calculator 540 may include various types of known software and/or hardware circuit configurations for calculating the absolute value and the difference between the data values corresponding to each coordinate.

In an embodiment, the first calculator 540 may normalize data values of the detection data DD based on a maximum value included in the detection data DD. For example, a value of the light intensity may be simplified based on the maximum value of the detection data DD. Also, the first calculator 540 may normalize data values of the corrected modeling data C_MDD based on a maximum value included in the corrected modeling data C_MDD. Accordingly, the first calculator 540 may calculate the differences in magnitudes DF_V of normalized values for each coordinate of the detection data DD and the corrected modeling data C_MDD.

In an embodiment, the first calculator 540 may include various types of software and/or hardware circuit configurations for normalizing data.

Since the first calculator 540 performs the calculation with the normalized values, the calculation result may be simplified.

The second calculator 550 may calculate the total sum of the differences in magnitudes DF_V as the representative value RPV corresponding to the degree of curvature of the region of interest ROI. For example, the representative value RPV may be understood as a deviation in light intensity between the detection data DD and the corrected modeling data C_MDD. For example, a method of calculating the representative value RPV using the first calculator 540 and the second calculator 550 may be expressed as Equation 1 below.

$$RPV = \sum_{a=1}^{x}\sum_{b=1}^{y}|D_{ab} - M_{ab}|$$ [Equation 1]

Here, RPV may be understood as the representative value, $D_{ab}$ may be understood as a data value (or normalized data value) of the coordinates (a, b) of the detection data DD, and $M_{ab}$ may be understood as a data value (or normalized data value) of the coordinates (a, b) of the corrected modeling data C_MDD. For example, a, b, x, and y may represent coordinates of the matrix MTX, a and b may be variables, x may be understood as a maximum value of row coordinates of the matrix MTX, and y may be understood as a maximum value of column coordinates of the matrix MTX. In this way, the total sum of deviations for each coordinate of the light distribution of surface reflection light included in the detection data DD and the light distribution of the corrected modeling data C_MDD, which may be a criterion for determining the curvature defect in the region of interest, may be understood as the representative value RPV. Also, a defect due to the curvature of the surface of the display panel DP may be determined based on the representative value RPV.

It can be interpreted that the larger the representative value RPV, the greater the deviation between the detection data DD and the corrected modeling data C_MDD. For example, as the representative value RPV is larger, it may be interpreted that the region of interest ROI is not flat.

The second calculator 550 may be implemented with various types of adder circuits. The second calculator 550 may provide the representative value RPV to the determiner 560.

The determiner 560 may determine whether the display panel DP is defective by comparing the representative value RPV with a threshold value THV. In case that the representative value RPV exceeds the threshold value THV, the determiner 560 may determine that the display panel DP is defective. For example, it may be determined that the display panel DP includes more surface curvature than the threshold criterion or includes a steep slope, and the corresponding display panel DP may be determined as a defective product. The determiner 560 may output a signal RES indicating that the display panel DP is defective.

In case that the representative value RPV is substantially equal to or less than the threshold value THV, the determiner 560 may determine that the display panel DP is normal.

The determiner 560 may include a comparator circuit implemented in various types of software and/or hardware. For example, the determiner 560 may include a comparison circuit that compares the digital format representative value RPV and the threshold value THV.

As described above, the apparatus 1000 for inspecting the display panel according to the embodiments of the disclosure may include a simple light detection structure and a simple comparison operation function. Accordingly, complex calculations such as data quantification for detecting surface defects of the display panel DP may be not required, and the apparatus 1000 for inspecting the display panel may quickly and inexpensively determine whether the degree of curvature of the region of interest ROI is within a tolerance. Accordingly, manufacturing cost can be reduced, and process yield, and product reliability can be improved.

Figure 10:
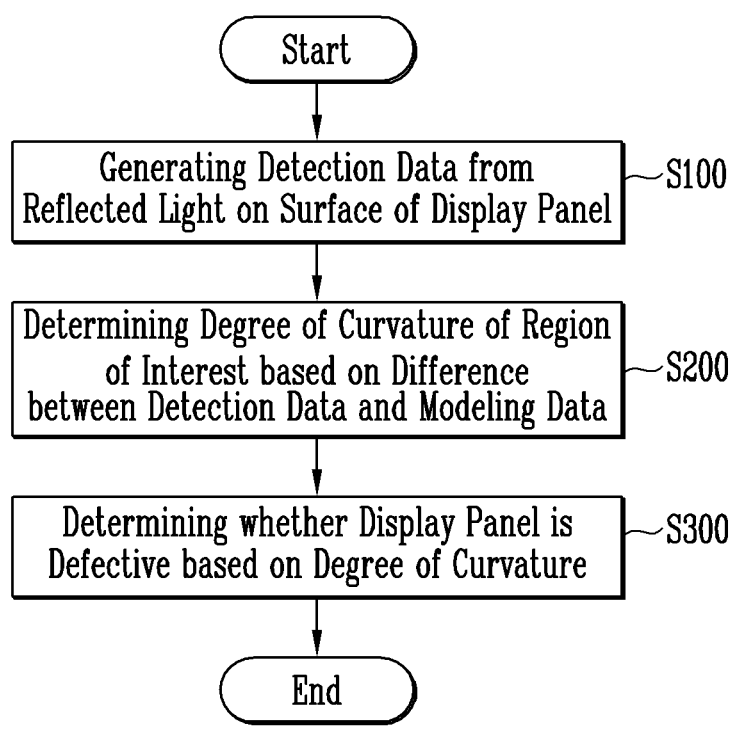
FIG. 10 is a schematic flowchart illustrating a method of inspecting a surface of a display panel according to embodiments of the disclosure.
Figure 11:
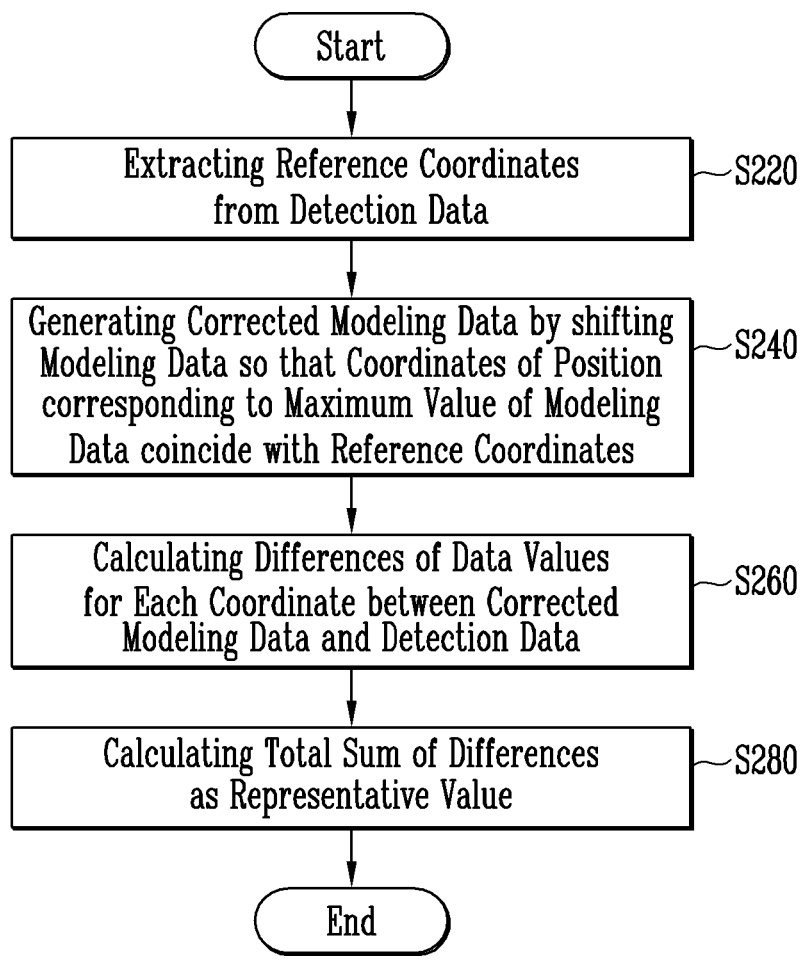
FIG. 11 is a schematic flowchart illustrating an example of a method of determining a degree of curvature of a region of interest included in the method of inspecting the surface of the display panel of FIG. 10.
Figure 12:
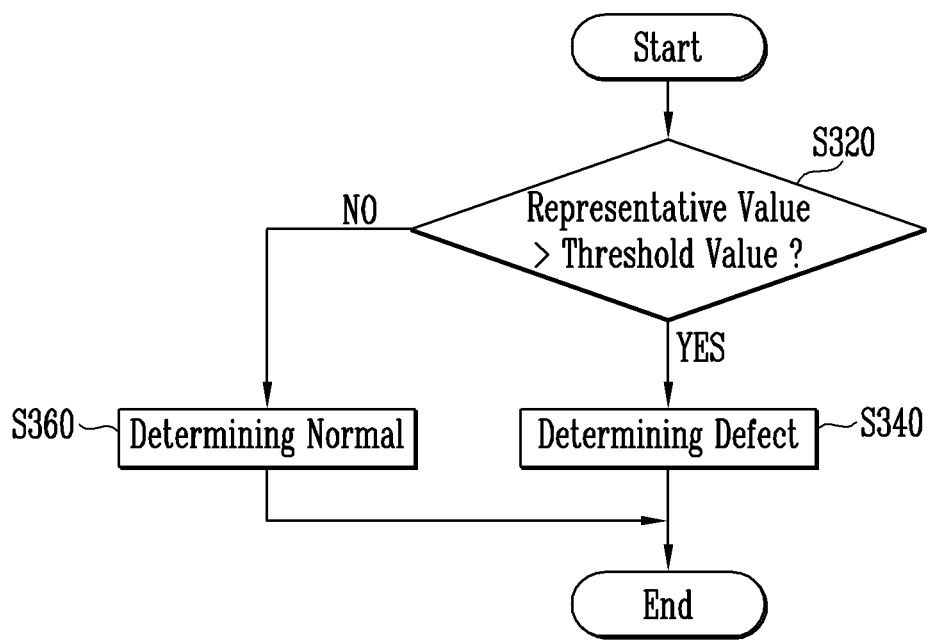
FIG. 12 is a schematic flowchart illustrating an example of a method for determining whether the display panel is defective, which is included in the method of inspecting the surface of the display panel of FIG. 10.

FIG. 10 is a schematic flowchart illustrating a method of inspecting a surface of a display panel according to embodiments of the disclosure. FIG. 11 is a schematic flowchart illustrating an example of a method of determining a degree of curvature of a region of interest included in the method of inspecting the surface of the display panel of FIG. 10. FIG. 12 is a schematic flowchart illustrating an example of a method for determining whether the display panel is defective, which may be included in the method of inspecting the surface of the display panel of FIG. 10.

Referring to FIGS. 1, 8, 10, 11, and 12, a method of inspecting a surface of a display panel may include generating detection data DD including distribution (for example, light profile) of light intensity from reflected light of incident light irradiated to a region of interest on a surface of the display panel DP (S100), determining a degree of curvature of the region of interest based on differences in magnitudes DF_V of data values for each coordinate between the detection data DD and modeling data MDD for the region of interest (S200), and determining whether the display panel DP is defective based on the degree of curvature (S300).

The reflected light of the light irradiated to the surface of the display panel DP may be provided to the light detector 200 through the lens system 400. The detection data DD including the distribution of light intensity of the reflected light may be generated by the light detector 200 (S100). In an embodiment, the incident light may be adjusted to correspond to the size of the region of interest. For example, an optical system for adjusting a light path may be disposed on a path of the incident light.

The degree of curvature of the region of interest ROI may be determined based on a difference between the detection data DD and the modeling data (e.g., predetermined or selectable modeling data) MDD (S200). The modeling data may include the distribution of reference light intensity for the region of interest ROI. The distribution of reference light intensity may be a criterion for determining the degree of curvature of the display panel.

In an embodiment, as shown in FIG. 11, a method for determining the degree of curvature (S200) may include extracting, as reference coordinates Ref(p, q), coordinates of a position corresponding to a maximum value of the light intensity included in the detection data DD (S220), generating corrected modeling data C_MDD by shifting the modeling data MDD so that coordinates MAX(i, j) (see, FIG. 9A) of a position corresponding to a maximum value of the reference light intensity of the modeling data MDD coincide with the reference coordinates Ref(p, q) (S240), calculating differences DF_V of data values for each coordinate between the corrected modeling data C_MDD and the detection data DD (S260), and calculating a total sum of the differences DF_V as a representative value RPV corresponding to the degree of curvature (S280).

Each of the differences DF_V of the data values for each coordinate may be an absolute value of a difference between data values of corresponding coordinates of the captured image including the detection data DD and the corrected modeling data C_MDD. The representative value RPV may be understood as the sum of these absolute values.

In an embodiment, as shown in FIG. 12, a method of determining whether the display panel DP is defective may include comparing the representative value RPV with a threshold value (e.g., a predetermined or selectable threshold value) THV (S320).

In case that the representative value RPV exceeds the threshold value THV, it may be determined that the display panel DP is defective (S340).

In case that the representative value RPV is substantially equal to or less than the threshold value THV, it may be determined that the curvature of the display panel DP or the display surface of the display panel DP is normal (S360).

Since the method of inspecting the surface of the display panel has been described in detail with reference to FIGS. 1 to 9C, duplicate descriptions thereof will be omitted.

As described above, according to the apparatus 1000 for inspecting the display panel and the method for inspecting the surface of the display panel according to the embodiments of the disclosure, the degree of curvature of the surface of the display panel DP may be determined using a simple surface reflection light detection structure and a simple comparison operation function. Accordingly, complex calculations such as data quantification for detecting surface defects of the display panel DP and inspection time delays are not required, and it is possible to quickly and inexpensively determine whether the degree of curvature of the region of interest is within a tolerance. Accordingly, manufacturing cost can be reduced, and process yield and product reliability can be improved.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. An apparatus for inspecting a display panel comprising:
a light source irradiating light toward a surface of the display panel;
a light detector detecting light reflected from a region of interest on the surface of the display panel to generate a captured image;
a lens system including at least one lens receiving reflected light and providing the reflected light to the light detector; and
an analyzer that:
quantifies a degree of curvature of the region of interest based on a result of comparing modeling data, the modeling data including a distribution of reference light intensity divided into coordinates for the region of interest, with detection data corresponding to the captured image, the detection data being divided into the same coordinates;
aligns the modeling data and the detection data by shifting the modeling data such that a maximum value coordinate of the reference light intensity in the modeling data coincides with a maximum value coordinate of light intensity in the detection data; and
determines whether the display panel is defective based on the quantified and aligned results.

2. The apparatus of claim 1, further comprising:
an optical system adjusting the light emitted from the light source into parallel light, providing the parallel light to the region of interest, and adjusting a diameter of the parallel light according to a size of the region of interest.

3. An apparatus for inspecting a display panel comprising:
a light source irradiating light toward a surface of the display panel;
a light detector detecting light reflected from a region of interest on the surface of the display panel to generate a captured image;
a lens system including at least one lens receiving reflected light and providing the reflected light to the light detector;
an analyzer quantifying a degree of curvature of the region of interest based on a result of comparing modeling data including distribution of reference light intensity for the region of interest with detection data corresponding to the captured image, and determining whether the display panel is defective based on a quantified result; and
an optical system adjusting the light emitted from the light source into parallel light, providing the parallel light to the region of interest, and adjusting a diameter of the parallel light according to a size of the region of interest, wherein
the analyzer includes:
a storage storing the modeling data according to the region of interest;
a first calculator calculating differences in magnitudes of data values for each coordinate between the modeling data and the detection data;
a second calculator calculating a total sum of the differences in magnitudes as a representative value corresponding to the degree of curvature; and a determiner comparing the representative value with a threshold value to determine whether the display panel is defective.

4. The apparatus of claim 3, wherein
the determiner determines that the display panel is defective in case that the representative value exceeds the threshold value, and
the determiner determines that the display panel is normal in case that the representative value is equal to or less than the threshold value.

5. The apparatus of claim 3, wherein the analyzer further includes:
a reference position extractor extracting, as reference coordinates, coordinates of a position corresponding to a maximum value of light intensity included in the detection data; and
a modeling data corrector generating corrected modeling data by shifting the modeling data so that coordinates of a position corresponding to a maximum value of the reference light intensity included in the modeling data coincide with the reference coordinates.

6. The apparatus of claim 5, wherein the first calculator calculates differences in magnitudes of data values for each coordinate between the corrected modeling data and the detection data.

7. The apparatus of claim 5, wherein the first calculator normalizes data values of the corrected modeling data based on a maximum value included in the corrected modeling data.

8. The apparatus of claim 7, wherein the first calculator normalizes data values of the detection data based on a maximum value included in the detection data.

9. The apparatus of claim 8, wherein the first calculator calculates differences in magnitudes of normalized values for each coordinate of the detection data and the corrected modeling data.

10. The apparatus of claim 3, wherein the detection data of the display panel determined to be normal is stored in the storage as the modeling data.

11. The apparatus of claim 1, wherein the light detector includes a CCD image sensor.

12. The apparatus of claim 1, wherein the light detector includes a CMOS image sensor.

13. A method for inspecting a surface of a display panel comprising:
generating detection data including distribution of light intensity from reflected light of incident light irradiated to a region of interest on a surface of the display panel, the detection data being divided into coordinates;
aligning the detection data with modeling data for the region of interest, the modeling data including a distribution of reference light intensity divided into the same coordinates, by shifting the modeling data such that a maximum value coordinate of the reference light intensity in the modeling data coincides with a maximum value coordinate of the light intensity in the detection data;
determining a degree of curvature of the region of interest based on differences in magnitudes of data values for each coordinate between the aligned detection data and the modeling data for the region of interest; and
determining whether the display panel is defective based on the degree of curvature.

14. The method of claim 13, wherein the coordinates are arranged in a grid format.

15. The method of claim 13, wherein the determining of the degree of curvature includes:
extracting, as reference coordinates, coordinates of a position corresponding to a maximum value of the light intensity included in the detection data; and
generating corrected modeling data by shifting the modeling data so that coordinates of a position corresponding to a maximum value of the reference light intensity of the modeling data coincide with the reference coordinates.

16. The method of claim 15, wherein the determining of the degree of curvature further includes calculating differences of data values for each coordinate between the corrected modeling data and the detection data.

17. The method of claim 16, wherein the determining of the degree of curvature further includes calculating a total sum of the differences as a representative value corresponding to the degree of curvature.

18. The method of claim 17, wherein the determining of whether the display panel is defective includes:
comparing the representative value with a threshold value;
determining that the display panel is defective in case that the representative value exceeds the threshold value; and
determining that the display panel is normal in case that the representative value is equal to or less than the threshold value.

19. The method of claim 17, wherein the incident light is adjusted to correspond to a size of the region of interest.

20. The method of claim 17, wherein each of the differences of data values is an absolute value of a difference between data values of corresponding coordinates between the detection data and the corrected modeling data.

* * * * *